(12) United States Patent
Yashima

(10) Patent No.: US 6,760,878 B2
(45) Date of Patent: Jul. 6, 2004

(54) INFORMATION REPRODUCTION APPARATUS

(75) Inventor: Noboru Yashima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 269 days.

(21) Appl. No.: 09/895,155

(22) Filed: Jul. 2, 2001

(65) Prior Publication Data
US 2002/0104057 A1 Aug. 1, 2002

(30) Foreign Application Priority Data
Jan. 29, 2001 (JP) ........................................ 2001-019348

(51) Int. Cl.⁷ .............................................. G11B 20/18
(52) U.S. Cl. ...................................................... 714/755
(58) Field of Search ........................................ 714/755

(56) References Cited

U.S. PATENT DOCUMENTS

| | | | | | |
|---|---|---|---|---|---|
| 4,653,051 A | * | 3/1987 | Sugimura et al. | ........... | 714/755 |
| 4,683,572 A | * | 7/1987 | Baggen et al. | ............... | 714/756 |
| 4,760,576 A | * | 7/1988 | Sako | ........................... | 714/755 |
| 4,792,953 A | * | 12/1988 | Pasdera et al. | .............. | 714/747 |
| 5,392,299 A | * | 2/1995 | Rhines et al. | ................ | 714/756 |
| 5,684,810 A | * | 11/1997 | Nakamura et al. | ........... | 714/755 |
| 6,029,266 A | * | 2/2000 | Lee | ............................. | 714/761 |
| 6,272,659 B1 | * | 8/2001 | Zook | ........................... | 714/774 |
| 6,321,351 B1 | * | 11/2001 | Brown et al. | ................ | 714/704 |

FOREIGN PATENT DOCUMENTS

JP 9-180379 7/1997

* cited by examiner

*Primary Examiner*—Stephen M. Baker
(74) *Attorney, Agent, or Firm*—Birch, Stewart, Kolasch & Birch, LLP

(57) ABSTRACT

An information reproduction apparatus includes an error corrector which performs a first error correction for correcting errors in a horizontal direction within an input data block comprised of a product code and subsequently a second error correction for correcting errors in a vertical direction within the same block is disclosed. The error corrector produces a first signal each time an uncorrectable code word is detected while the first error correction is being performed. The apparatus further includes a first counter for counting the first signal, a comparator for comparing a count value of the first counter with a predetermined value and producing a second signal when the count value reaches the predetermined value, and a determination device determining that there is an error within the data block which the error corrector cannot correct, and delivering a third signal in response to the second signal to reread the data block.

12 Claims, 12 Drawing Sheets

INFORMATION REPRODUCTION APPARATUS

FIELD OF THE INVENTION

The present invention relates to an information reproduction apparatus provided with a capability of performing error correction processing and error detection processing on input data.

BACKGROUND OF THE INVENTION

Random errors or burst errors often occur to data read from a CDROM, a DVD or the like due to noises or disk scratches. Accordingly, error correction processing and error detection processing are carried out by use of error correction codes and error detection codes to obtain correct data.

FIG. 9. shows a data structure in DVD. One sector is comprised of a 2366-byte code including 2048-byte main data to which a header, an EDC (Error Detection Code), and an ECC (Error Correction Code) are attached. As shown in FIG. 10, one sector consists of 26 frames. Accordingly, as shown in FIG. 11, the period of a frame synchronization signal is one twenty sixth the period of a sector synchronization signal.

FIG. 12 shows a structure of an error correction block in DVD. As shown in this figure, one 32-KB (kilobyte) error correction block is formed as a product code from 16 sectors. The error correction processing on the error correction block is comprised of a first error correction (horizontal correction) and a subsequent second error correction (vertical correction). Even when there are some codes that could not be corrected by carrying out the first error correction, they can be corrected by carrying out the second error correction if they are smaller in number than a certain value.

After the first error correction and the second error correction are completed for the whole of the error correction block, data descrambling is carried out, and subsequently the error detection processing is carried out on a sector-by-sector basis by use of EDCs. As described in Japanese Unexamined Patent Publication No. 180379-97 for example, it is also known that an interval between two successive synchronization signals of two consecutive sectors is compared with a reference interval to detect errors with the aim of dispensing with a specific error detection circuit that detects errors by use of EDCs.

FIG. 13 shows a structure of an information reproduction apparatus provided with a conventional error correction/detection capability for reproducing information from a disk (DVD). In FIG. 13, 100 denotes a disk, 101 denotes a head amplifier, 104 denotes a memory, 113 denotes a controller, 114 denotes a servocontroller, and 120 denotes a signal processing unit. The signal processing unit 120 includes a demodulator 102, a memory write device 103, a block synchronization signal producing device 105, a counter 106, a sequencer 107, an error corrector 108, a first memory read/write device 109, an error detector 110, a second memory read/write device 111, a data read device 116, and a data output device 115. The functions of the above-described elements of the information reproduction apparatus will be explained below.

The head amplifier 101 reads signals from the disk 100, and converts them into digital signals. The demodulator 102 demodulates the digital signals to produce data constituting a part of a code word, and also produces sector synchronization signals. The memory write device 103 writes the demodulated data into the memory 104. The memory 104 holds the demodulated data, as well as data after the error correction processing, data that has undergone the descrambling and the error detection processing, and data to be output to the outside. The block synchronization signal producing device 105 produces a block synchronization signal from the sector synchronization signals output from the demodulator 102 for each error correction block formed from 16 sectors. The counter 106 is initialized by the block synchronization signal output from the block synchronization signal producing device 105, and updates its count value when the error corrector 108 completes error correction in each correction mode (the first error correction mode, or the second error correction mode).

The sequencer 107 sets the mode, in which the error corrector 108 operates, based on the count value of the counter 106. The error corrector 108 accesses the memory 104 by way of the first memory read/write device 109 to read or write data, and performs the first or the second error correction following instructions from the sequencer 107. The error corrector 108 also outputs a signal indicative of the error correction in each mode having been completed, this signal being counted by the counter 106. The first memory read/write device 109 accesses the memory 104 in accordance with a request from the error corrector 108.

The error detector 110 access the data that has undergone the first error correction and the second error correction and is held in the memory 104 by way of the second memory read/write device 111, and carries out the descrambling to detect errors on a sector-by-sector basis by use of EDCs. The error detector 110 outputs an error detection signal to the controller 113 when detecting an error. The servocontroller 114 performs a disk rotation control for reading data from the disk 100, and a tracking control of a pickup. The data output device 115 reads data held in the memory 104 by way of the data read device 116 in accordance with a request from the outside, and outputs the data to the outside. The controller 113, which is for controlling the entire operation of the information reproduction apparatus, commands the servocontroller 114 to read again the error correction block that has been detected to have an error, upon receipt of the error detection signal from the error detector 110.

The operation of this apparatus will be explained below with reference to a timing chart shown in FIG. 14 for a case where there exists an uncorrectable code in the M-th sector within an error correction block read from the disk 100 and written into the memory 104. FIG. 14 shows the sector synchronization signal output from the demodulator 102, the block synchronization signal output from the block synchronization signal producing device 105 for each error correction block, a logical state of the sequencer 107, a count value of the counter 106, and addresses of spaces within the memory 104 which are accessed by the memory write device 103, the first memory read/write device 109, and the second memory read/write device 111 respectively.

Signals recorded in the disk 100 are read by the head amplifier 101, converted into digital form, and supplied to the demodulator 102. The demodulator 102 writes demodulated data into the memory 104 by use of the memory write device 103, while outputting sector synchronization signals to the block synchronization signal producing device 105. The block synchronization signal producing device 105 produces the block synchronization signal from the sector synchronization signals. The counter 106 is initialized by the block synchronization signal output from the block synchronization signal producing device 105 to have the initial count value of "1" for example. The sequencer 107 outputs, to the error corrector 108, a signal which stays at "L" level during a period over which the error correction processing is performed, and a signal which is at "H" level when causing the error corrector 108 to perform the first error correction and at "L" level when causing the error corrector 108 to perform the second error correction. The error corrector 108 corrects errors in the data within the memory 104 by use of the first memory read/write device 109 in accordance with a signal from the sequencer 107. The error detector 110 access the memory 104 holding the data which has undergone the error correction processing by way of the second memory read device 111 to perform error detection processing.

As shown in FIG. 14, assuming that the address of the space holding the data which has undergone the error correction processing is N, the error detector 110 starts to perform the error detection processing on the space of the address N with a block synchronization signal following the block synchronization signal with which the error correction processing was started. The error detector 110 outputs, to the controller 113, a signal which stays at "L" level during a period over which the error detection processing for 16 sectors is performed, and an error detection signal which is at "H" level when a sector including an error (that is, the M-th sector) is detected.

It is during execution of the error detection processing following the error correction processing when the error detector 110 outputs the error detection signal to the controller 113. The controller 113 commands, upon receipt of the error detection signal, the servocontroller 114 to start the control for reading again the error correction block including the sector which has been detected to have an error.

As described above, the conventional information reproduction apparatus is configured to execute the second error correction subsequent to the first error correction irrespective of the result of the first error correction (the number of uncorrectable code words), and to check the presence or absence of errors on sector-by-sector basis by use of EDCs after completion of the entire error correction processing for one error correction block. Accordingly, there is a large time lag between a moment at which an error correction block read from the disk is written into the memory and a moment at which the block is read again from the disk because the block is recognized to include a sector that has a code word that could not be corrected by performing the first error correction. Therefore, since there are many sectors which the servocontroller has to retrace to read the block again, the control becomes difficult and a long stabilization period is required. Furthermore, when it takes a long time to read the block including a sector that has been detected to have an error for the second time, the memory runs out of data to be output to the outside through the data output device, and thereby data output discontinues.

On the other hand, in the information reproduction apparatus that is configured to measure the interval of sector synchronization signals and recognize existence of an error when the measured interval is different from a reference interval, there is a possibility that errors which could be corrected by completing the error correction processing dedicated to a product code are determined as uncorrectable, and needless rereading of data is carried out.

OBJECT AND SUMMARY OF THE INVENTION

The present invention has been made to solve the above problems with an object of providing an information reproduction apparatus capable of detecting errors at an early stage with high accuracy without using EDCs.

The object is achieved by an information reproduction apparatus including an error corrector which performs a first error correction for correcting errors in a horizontal direction within an input data block comprised of a product code and subsequently a second error correction for correcting errors in a vertical direction within said input data block,
said error corrector producing a first signal each time an uncorrectable code word is detected while said first error correction is being performed;
said information reproduction apparatus further including:
a first counter for counting said first signal;
a comparator for comparing a count value of said first counter with a predetermined value and producing a second signal when said count value reaches said predetermined value; and
a determination device determining that there is an error within said input data block which said error corrector cannot correct, and delivering a third signal to the outside in response said second signal.

The information reproduction apparatus may further include a synchronization signal producing device for producing, from input data constituting an input data block, a synchronization signal used for synchronizing elements within said information reproduction apparatus.

The information reproduction apparatus may further include a synchronizer for delivering said count value of said first counter to said comparator in synchronization with said synchronization signal.

The information reproduction apparatus may further include:
a demodulator for demodulating input data with reference to a table in which a plurality of pieces of data are registered and outputting demodulated data as a part of a code word;
a device for producing a fourth signal when said input data does not match any of said plurality of pieces of data registered in said table;
a second counter for counting said fourth signal; and
a reading device for reading a count value of said second counter and outputting said count value read from said second counter to said first counter;
said first counter counting said first signal only for code words count values on which output from said reading device exceed a predetermined value.

The information reproduction apparatus may further include a data reading device for reading data to be reproduced, said data reading device performing rereading of said input data block in response to said third signal.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
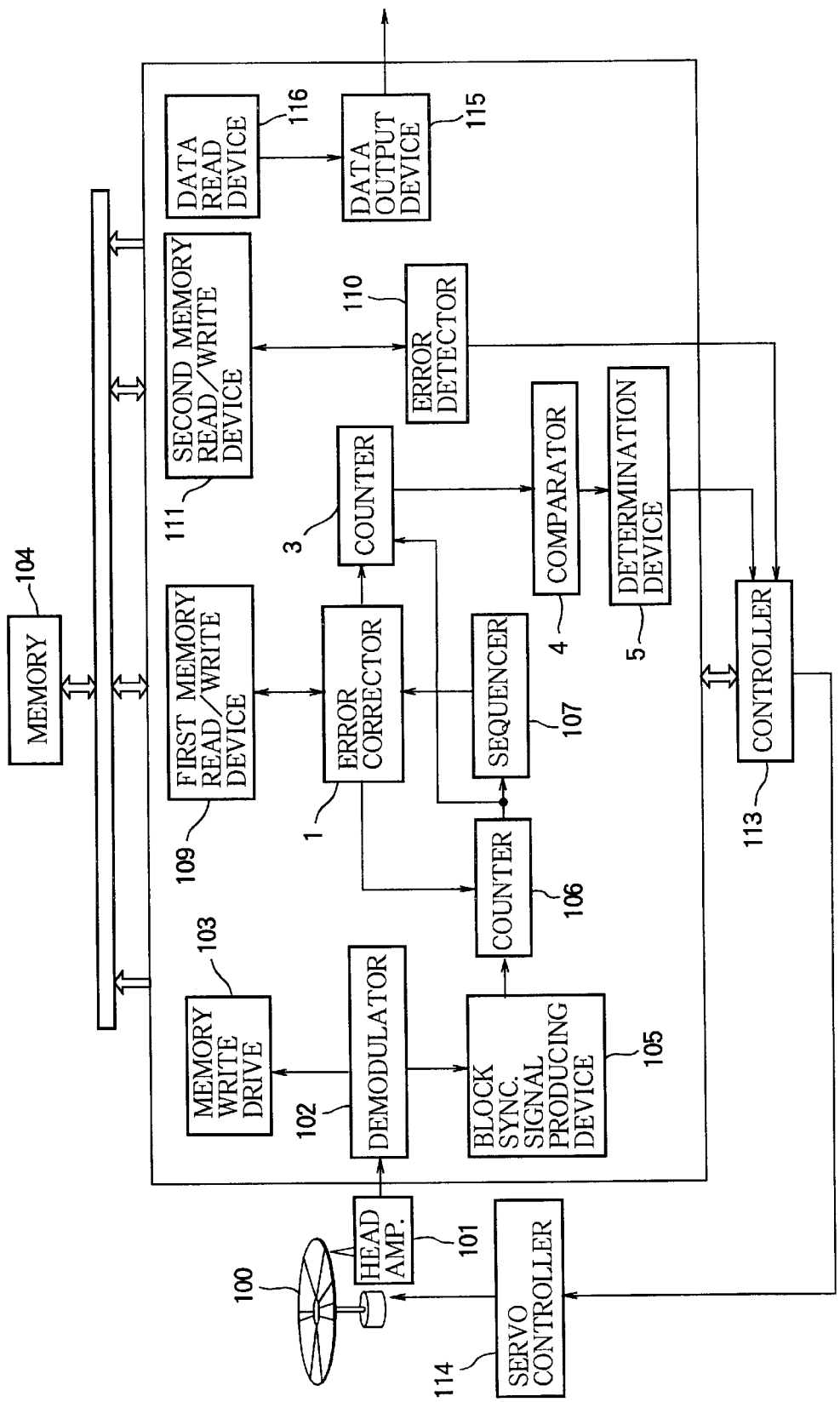
FIG. 1 is a block diagram showing a structure of a first example of the information reproduction apparatus according to the invention.
Figure 13:
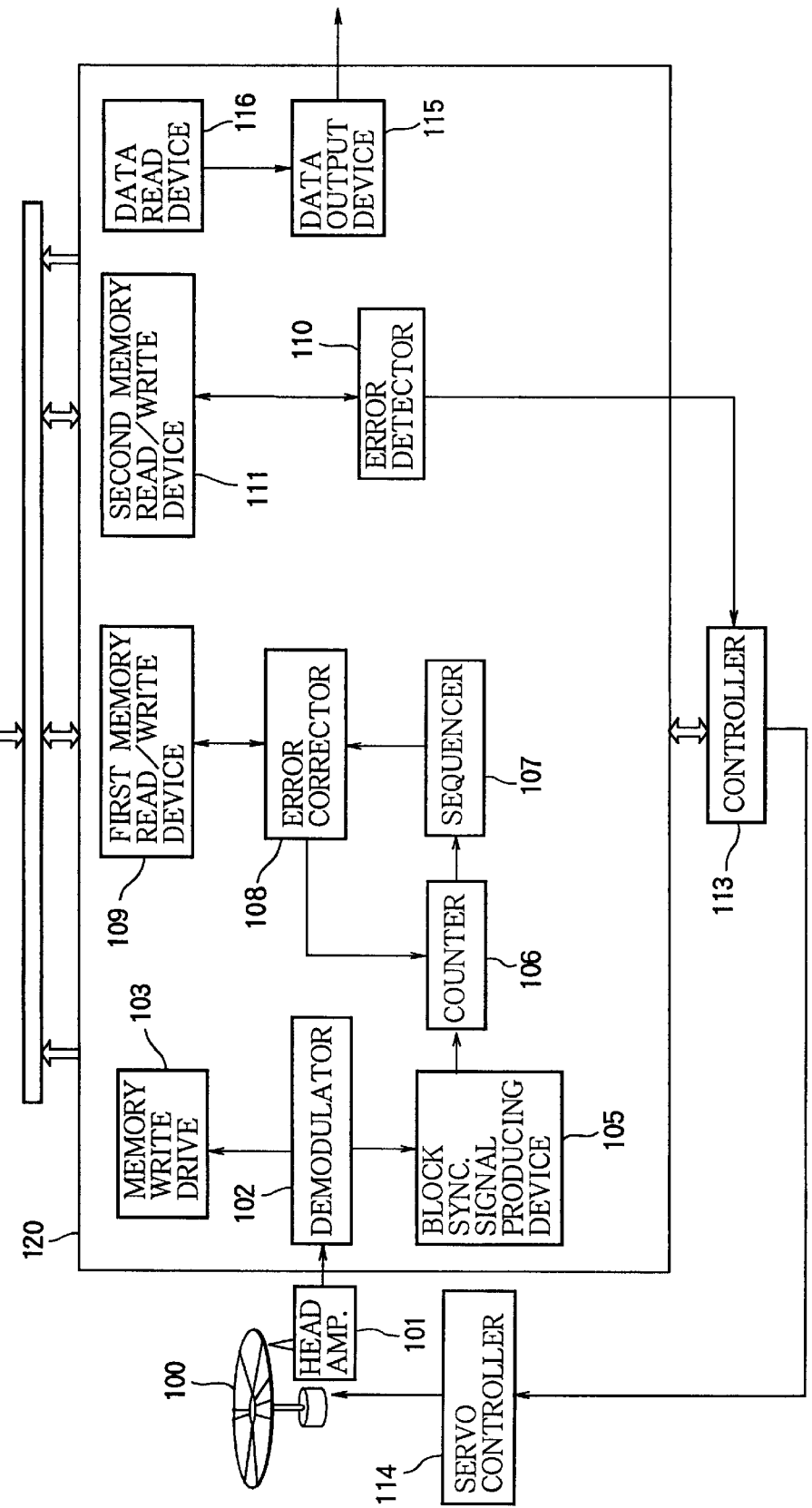
FIG. 13 is a block diagram showing a structure of a conventional information reproduction apparatus.
Figure 14:
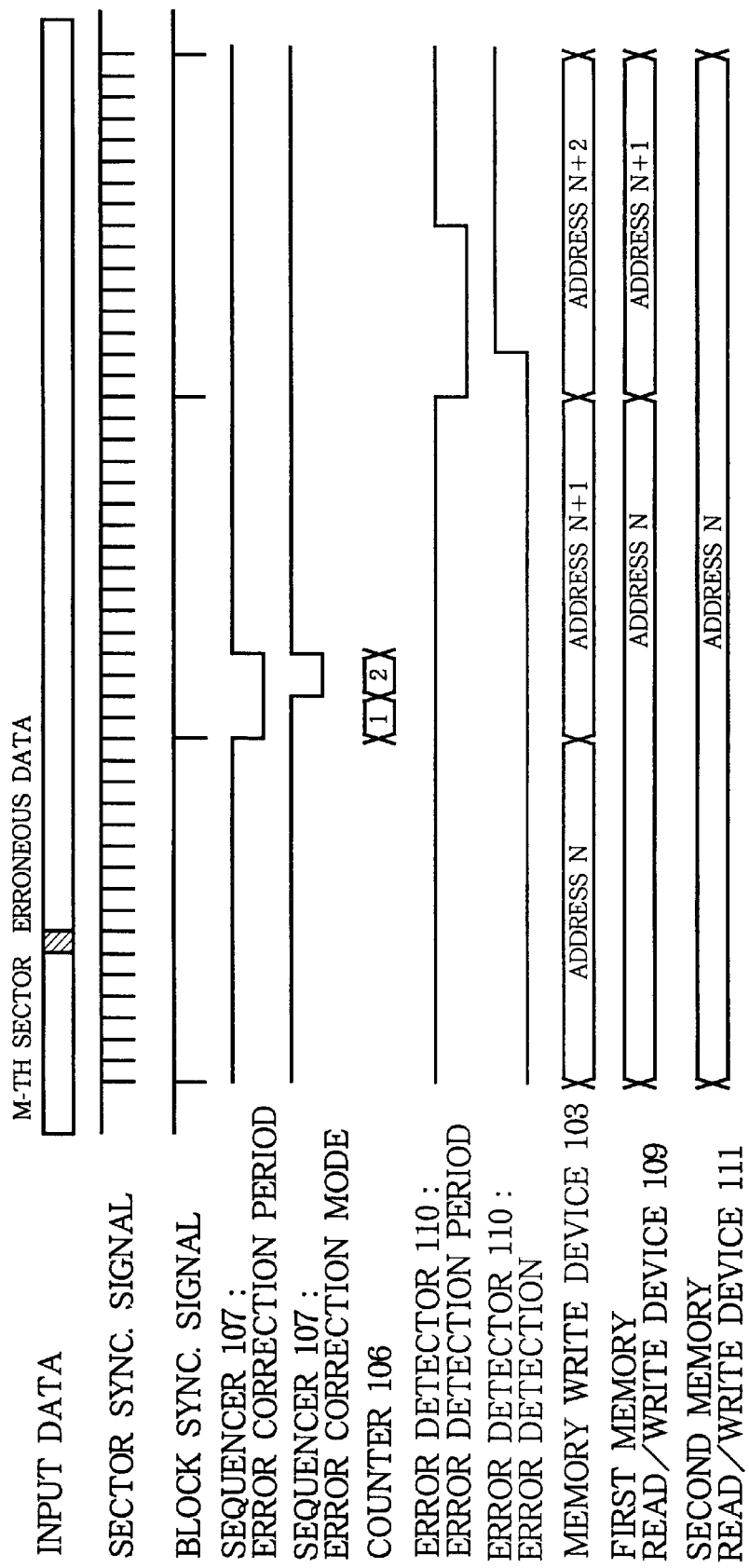
FIG. 14 is a timing chart for explaining operation of the conventional information reproduction apparatus.

FIG. 1 is a block diagram showing a structure of a first example of the information reproduction apparatus according to the present invention. In FIG. 1, the elements that are the same as those in FIG. 13 are given the same reference numerals, and explanation thereof will be omitted. Like the error corrector 108 of FIG. 13, an error corrector 1 of FIG. 1 accesses the memory 104 by way of the first memory read/write device 109, performs the mode change between the first error correction mode and the second error correction mode in accordance with instructions from the sequencer 107, and outputs an error correction completion signal for each mode, this error correction completion signal being counted by the counter 106. The error corrector 1 differs from the error corrector 108 in that the error corrector 1 produces an uncorrectable code detection signal each time it detects a code including an uncorrectable error.

The apparatus of this first example further includes a counter 3, a comparator 4, and a determination device 5. The counter 3 counts uncorrectable code detection signals input while the count value of the counter 106 is "1", that is, while the error corrector 1 is operating in the first error correction mode. In DVD, since the number of codes in the horizontal direction included in one error correction block is 208, the maximum count value of the counter 3 is 208. The comparator 4 compares the count value of the counter 3 with a predetermined value, and outputs a comparison result signal to the determination device 5 when the count value reaches the predetermined value. The determination device 5 determines, upon receipt of the comparison result signal, that the block under the error correction processing includes an uncorrectable error, and outputs an uncorrectable block detection signal to the controller 113 to reread this block.

Figure 2:
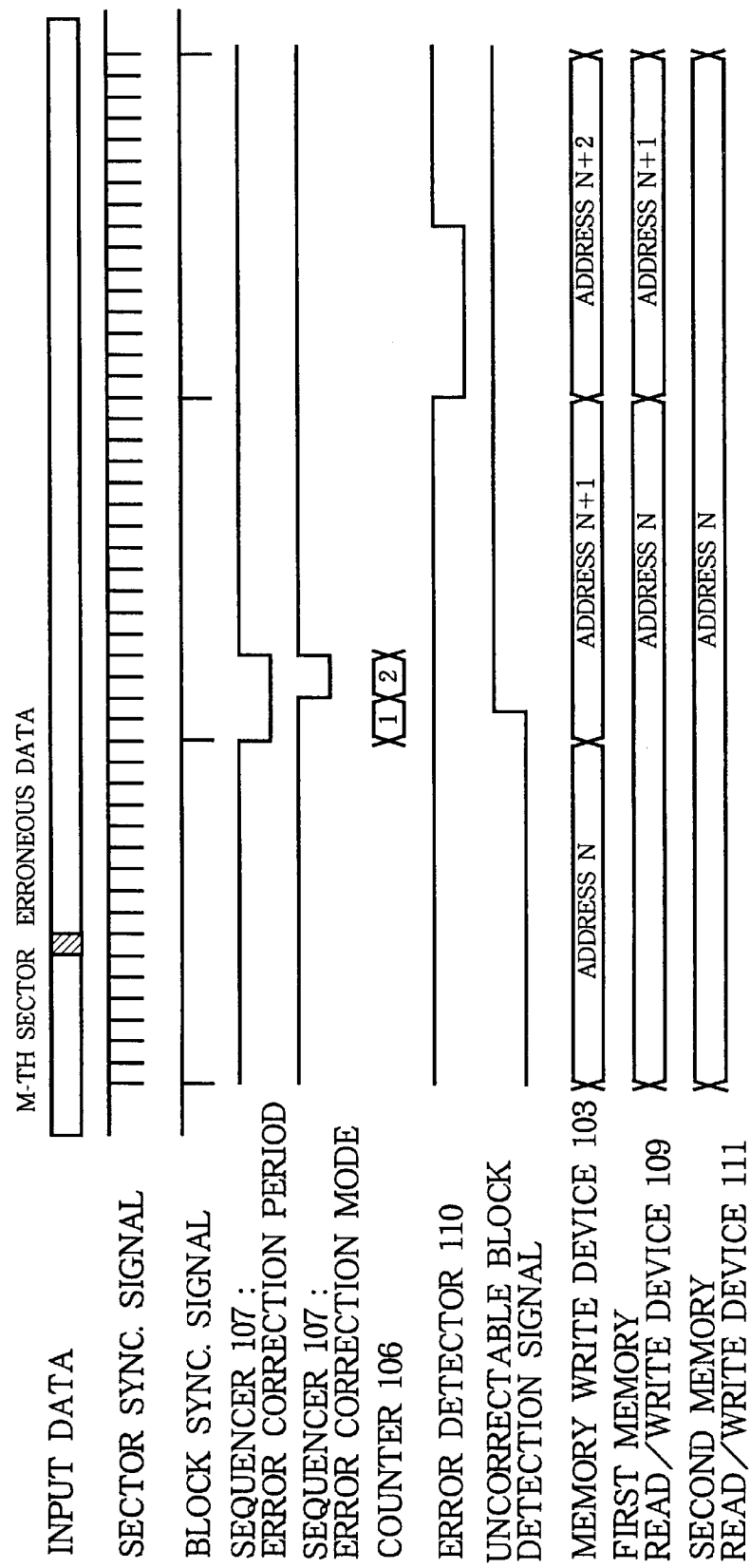
FIG. 2 is a timing chart for explaining operation of the apparatus of the first example.

The operation of the apparatus of the first example will now be explained with reference to a timing chart of FIG. 2. The counter 106 is initialized by the block synchronization signal output from the block synchronization signal producing device 105, and outputs a value "1" to the sequencer 107. In response to this, the sequencer 107 causes the error corrector 1 to perform the first error correction. The error corrector 1 produces the uncorrectable code detection signal when it detects, while the first error correction is being performed, a code that includes many errors (more than 6 in this example) and accordingly is uncorrectable. The counter 3 counts the uncorrectable code detection signals output from the error corrector 1. In this example, detection of uncorrectable codes is performed only while the error corrector 1 is performing the first error correction. Accordingly, no uncorrectable code detection signal is output while the error corrector 1 is performing the second error correction.

The comparator 4 compares the count value of the counter 3 with the predetermined value, and, when the count value reaches the predetermined value, outputs a comparison result signal indicative of it to the determination device 5. In a case where the predetermined value is 208, the comparison result signal is output if all the 208 codes in the horizontal direction included in one error correction block are uncorrectable. It allows a block to be reread when a burst error has occurred. The determination device 5 determines, upon receipt of the comparison result signal from the comparator 4, that the block under the error correction processing includes an uncorrectable error (sector), and outputs an uncorrectable block detection signal to the controller 13.

As described above, if the number of uncorrectable codes exceeds the predetermined value while the error corrector 1 is performing the first error correction, the determination device 5 determines that there is an error in the block under the error correction processing which cannot be corrected even if the processing is completed, and outputs the uncorrectable block detection signal to the controller 113. The controller 113, in response to this uncorrectable block detection signal, commands the servocontroller 114 to read the error correction block including this error for the second time. Accordingly, it is possible to start the rereading of data earlier compared with the case where a sector including an error is detected by the error detector 110.

Figure 3:
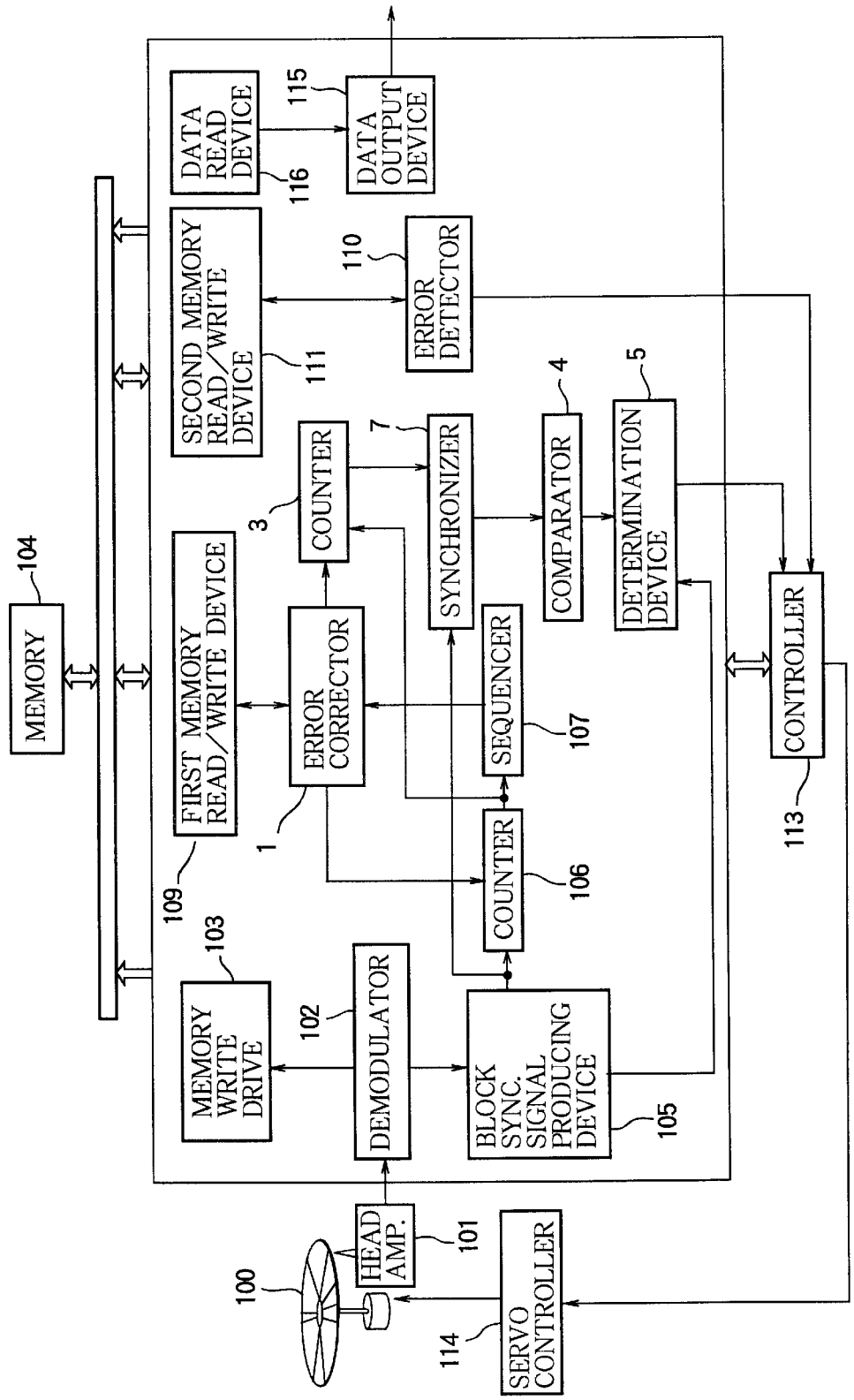
FIG. 3 is a block diagram showing a structure of a second example of the information reproduction apparatus according to the invention.
Figure 4:
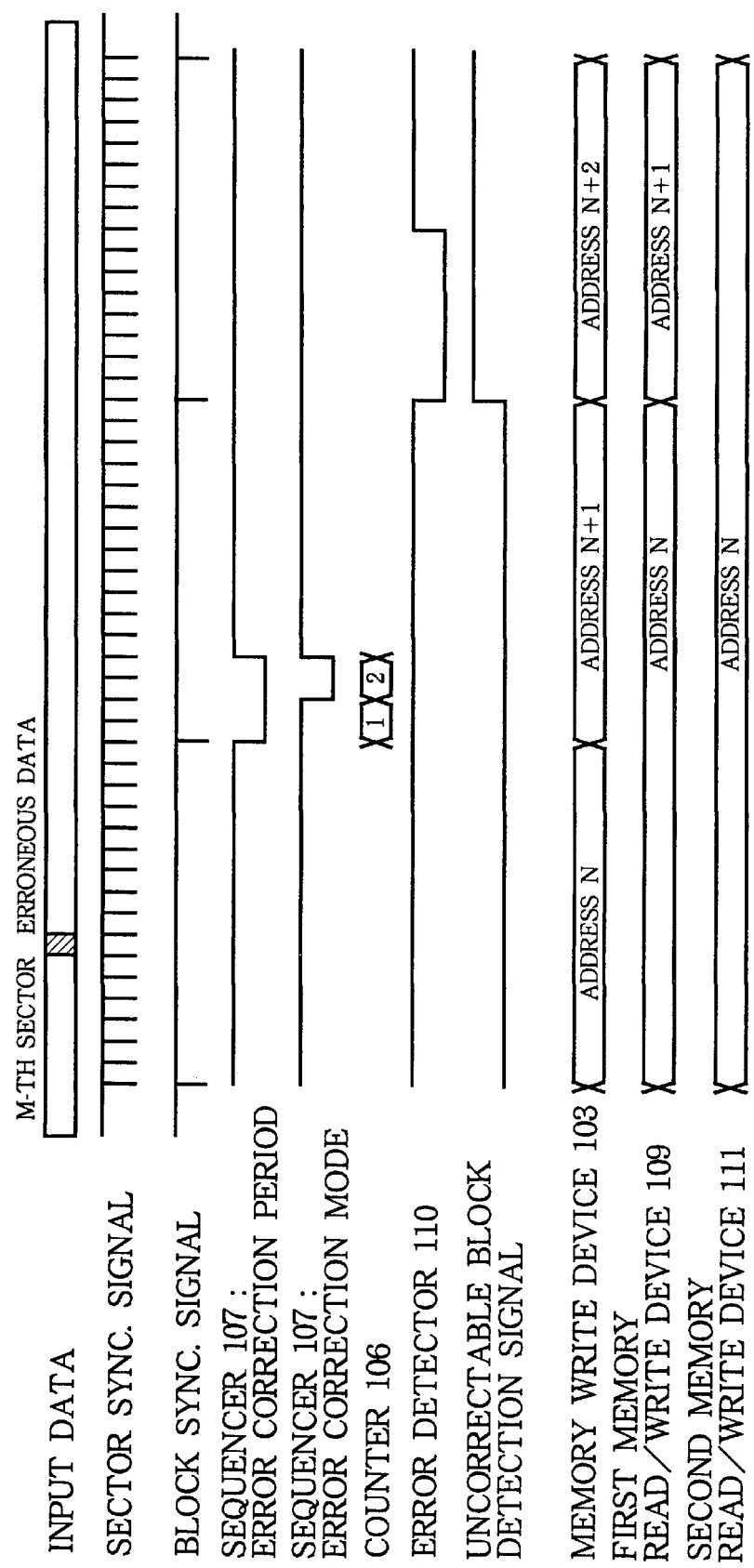
FIG. 4 is a timing chart for explaining operation of the apparatus of the second example.

FIG. 3 shows a structure of a second example of the information reproduction apparatus according to the present invention. The second example differs from the first example in that a synchronizer 7 is provided between the counter 3 and the comparator 4. The operation of the apparatus of the second example will be explained with reference to a timing chart of FIG. 4. In the second example, as well as the first example, the uncorrectable code detection signal is output only during the period over which the first error correction is performed. The counter 3 updates its count value each time it receives the uncorrectable code detection signal, however, the timing of the update is asynchronous to the block synchronization signal produced by the block synchronization signal producing device 105. The synchronizer 7 performs timing adjustment so that the timing of the update of the signal delivered from the counter 3 to the comparator 4 is synchronized with the block synchronization signal produced by the block synchronization signal producing device 105.

The comparator 4 compares a set value with the count value of the counter 3 output in synchronization with the block synchronization signal produced by the block synchronization signal producing device 105. The determination device 5 outputs the uncorrectable block detection signal to the controller 113 in synchronization with the block synchronization signal produced by the block synchronization signal producing device 105 on the basis of the comparison result of the comparator 4.

With the second example, the burden of timing adjustment on the controller 113 is relieved, since the uncorrectable block detection signal can be output in synchronization with the block synchronization signal.

Figure 5:
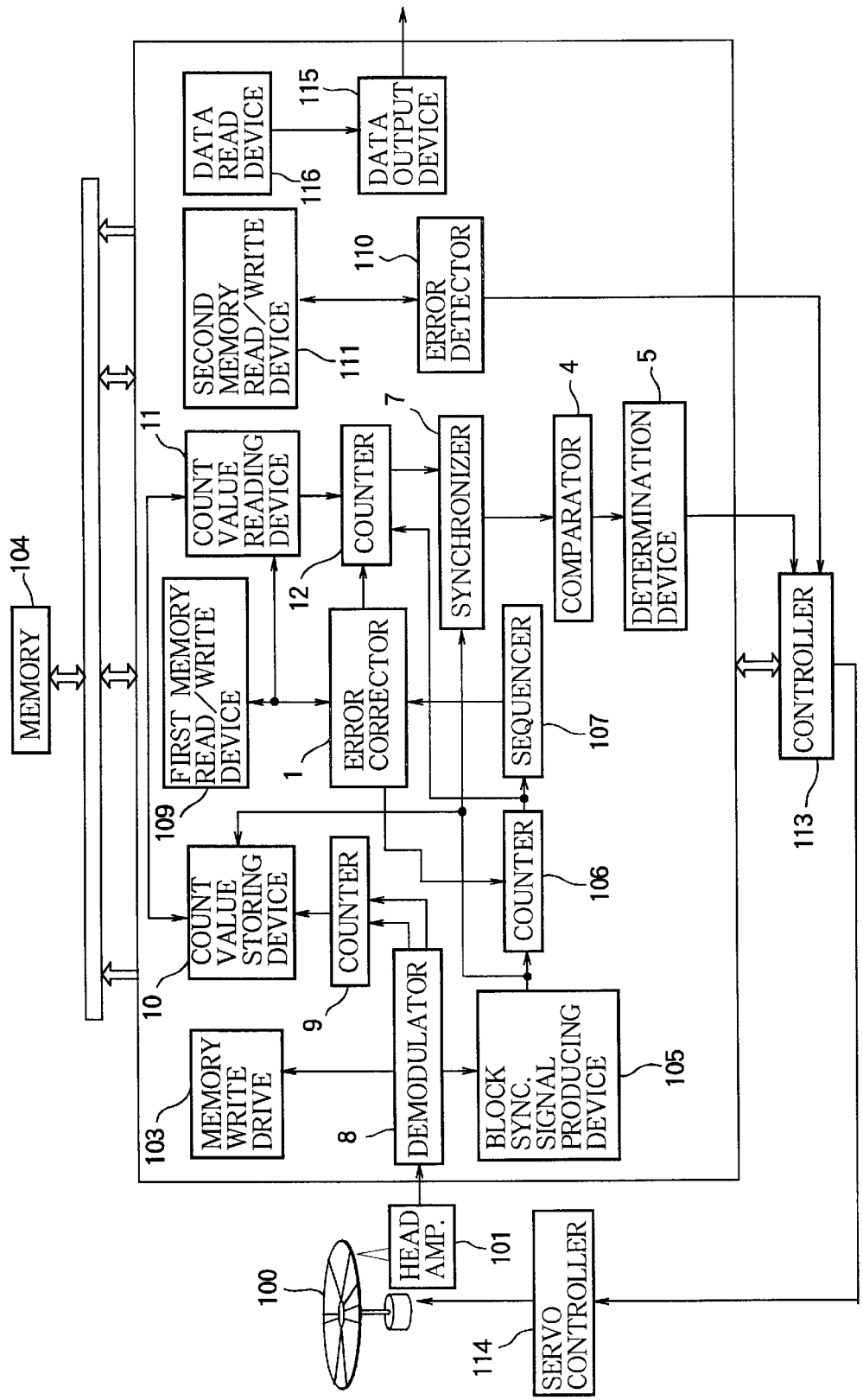
FIG. 5 is a block diagram showing a structure of a third example of the information reproduction apparatus according to the invention.

FIG. 5 shows a structure of a third example 3 of the information reproduction apparatus according to the present invention. The third example differs from the second example in that the third example has a demodulator 8 and a counter 12 instead of the demodulator 102 and the counter 3, and further has a count value storing device 10 and a count value reading device 11.

The demodulator 8 compares data (2-byte data or 16-bit data, for example) input from the head amplifier 101 with a plurality of pieces of 2-byte data registered in a demodulation table. When the input data is the one registered in the demodulation table, the demodulator 8 outputs, referring to the demodulation table, 1-byte data (8-bit data) corresponding to the input 2-byte data to the memory write device 103. On the other hand, when the input data does not match any of the pieces of data registered in the demodulation table, the demodulator 8 determines that the data was not read correctly, and outputs a demodulation-impossibility signal to the counter 9. The counter 9 counts the demodulation-impossibility signal in synchronization with the frame synchronization signal output from the demodulator 8. The count value storing device 10 stores the count value of the counter 9 for each error correction block, that is, in 16-sector×26-frame blocks. The count value reading device 11 reads the count value from the count value storing device 10 while the error corrector 1 is performing the first error correction. The counter 12 counts the uncorrectable code detection signals output from the error corrector 1 only when the count value output from the count value reading device 11 is larger than a predetermined value.

Figure 6:
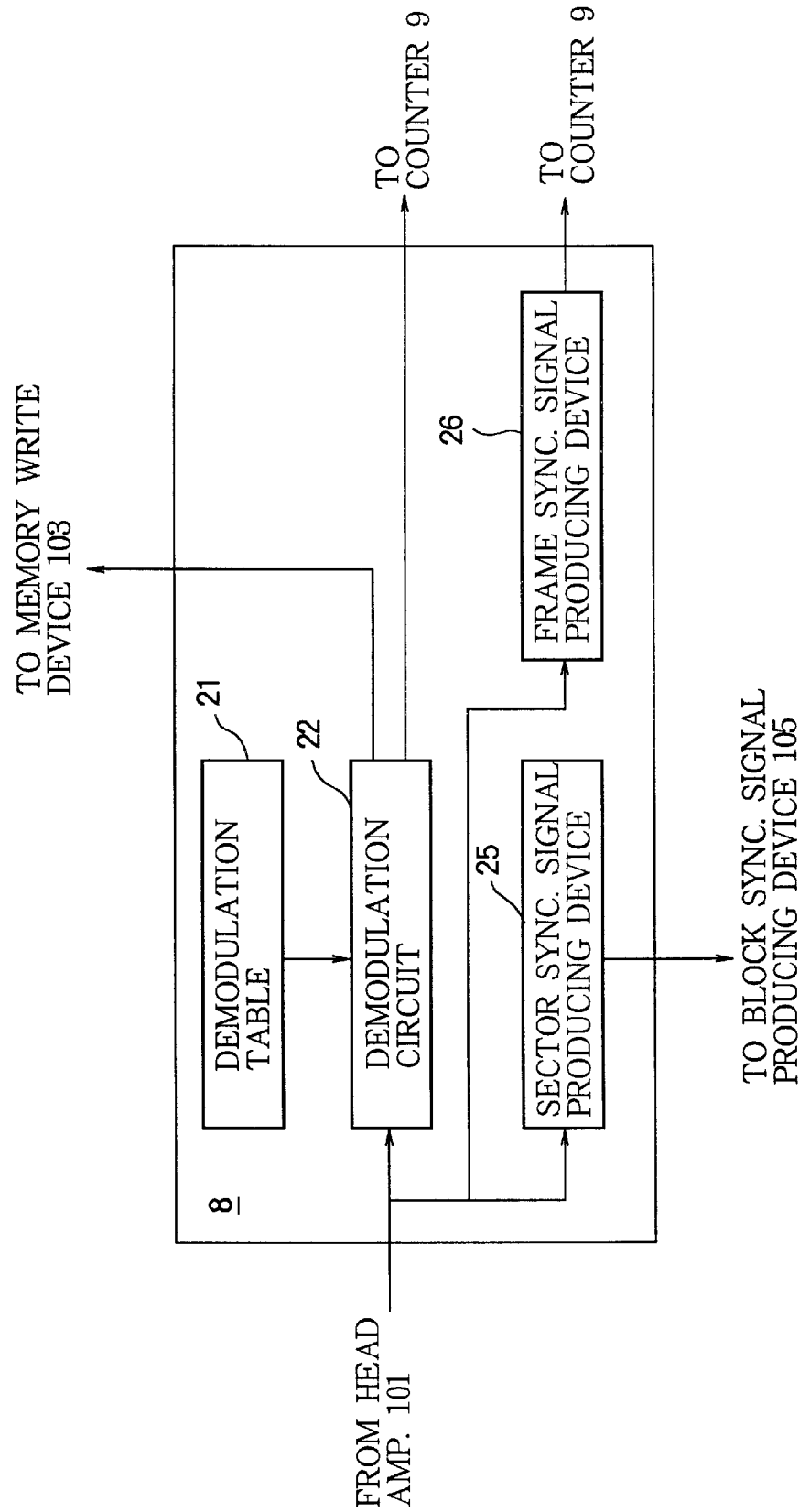
FIG. 6 is a block diagram showing a structure of a demodulator of the information reproduction apparatus of the third example.

FIG. 6 shows a structure of the demodulator 8. In this figure, 21 denotes a demodulation table in which registered pieces of data are stored, 22 denotes a demodulation circuit which reproduces original data from data input form the head amplifier 101 referring to the demodulation table 21, outputs it to the memory write device 103, or outputs the demodulation-impossibility signal to the counter 9 if the input data does not match any of the pieces of data registered in the demodulation table 21, 25 denotes a sector synchronization signal producing device for producing sector synchronization signals based on the input data from the head amplifier 101 and outputs them to the block synchronization signal producing device 105, and 26 denotes a frame synchronization signal producing device for producing frame synchronization signals based on the input data from the head amplifier 101 and outputs them to the counter 9.

Figure 7:
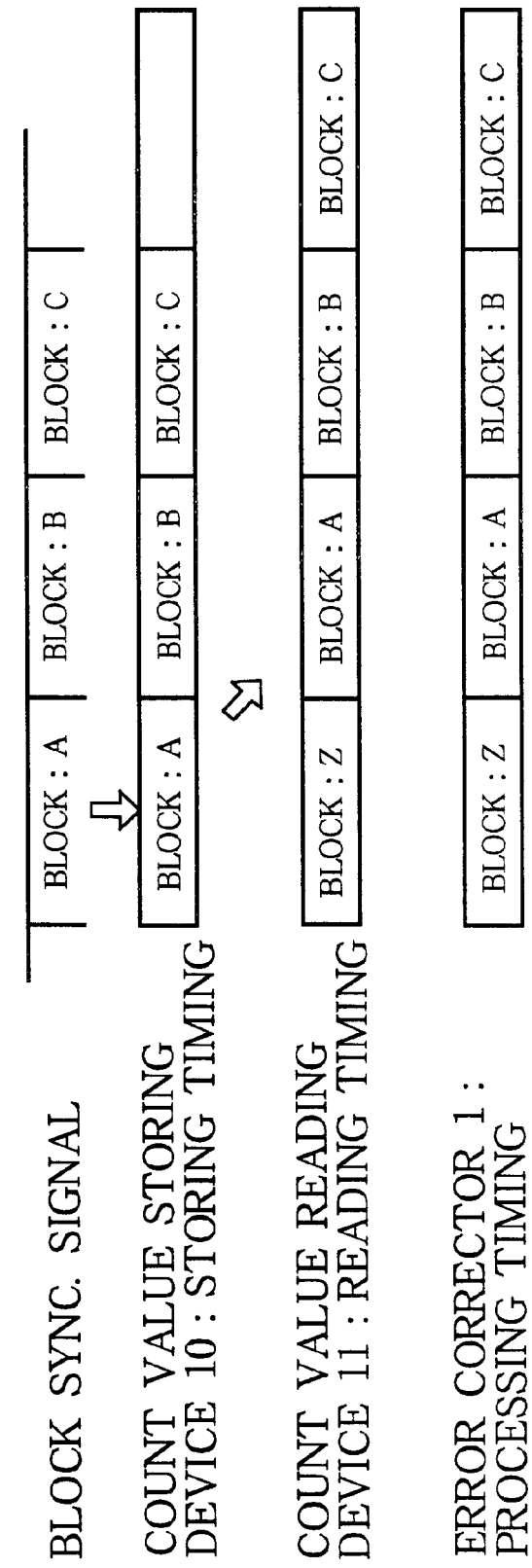
FIG. 7 is a timing chart for explaining operation of the apparatus of the third example.

The operation of the apparatus of the third example will be explained with reference to timing charts shown in FIGS. 7 and 8. The demodulator 8 produces the demodulation-impossibility signal if input data is not the one registered in the demodulation table 21. The counter 9 counts the demodulation-impossibility signal in synchronization with the frame synchronization signal. The result of the count is stored in the count value storing device 10 for each error correction block, that is, in 16-sector×26-frame blocks. As shown in FIG. 7, while the error corrector 1 is performing the first error correction on an error correction block A, the count value reading device 11 reads the count value on this block A from the count value storing device 10, and outputs it to the counter 12.

Figure 8:
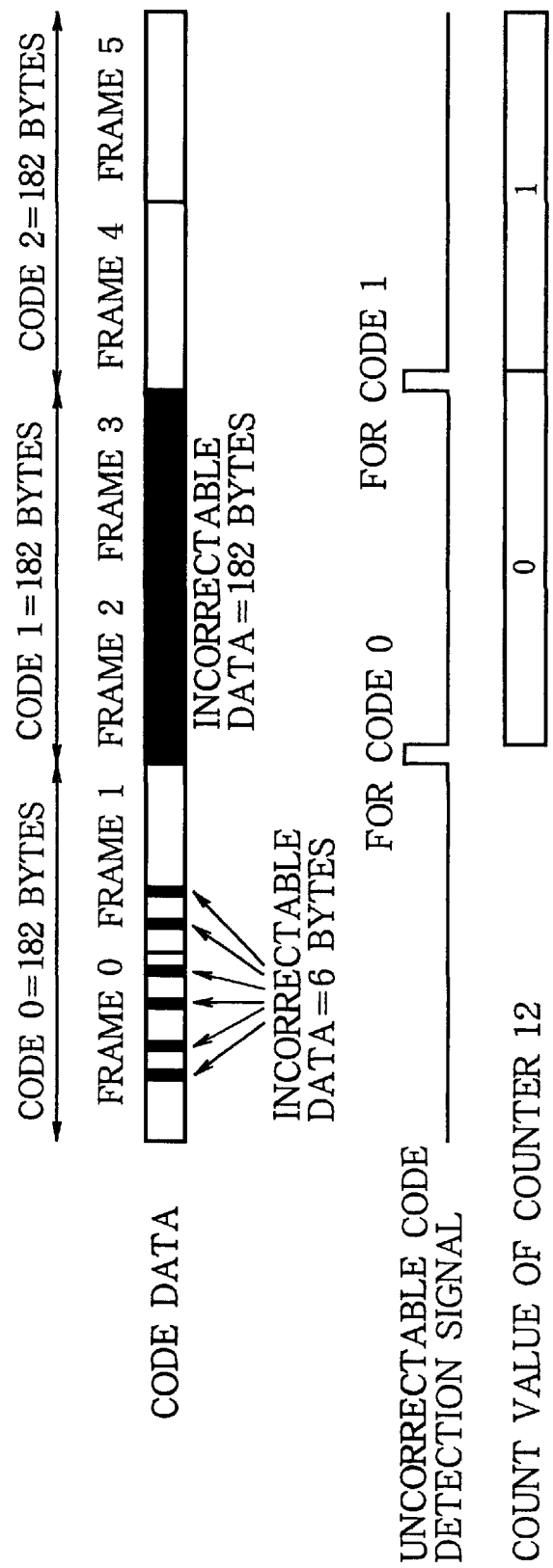
FIG. 8 is a timing chart for explaining operation of the apparatus of the third example.
Figure 9:
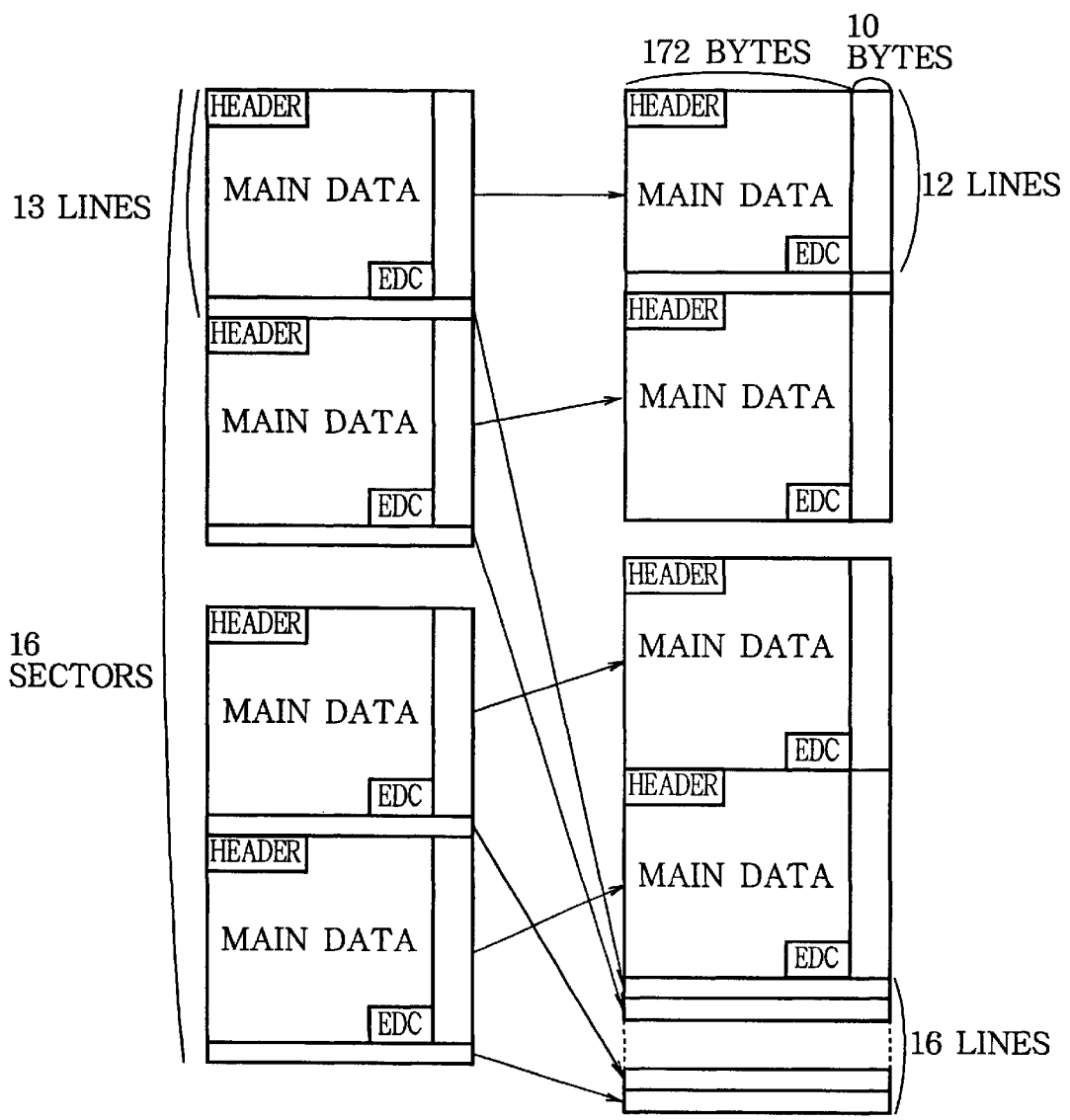
FIG. 9 is a view showing data structure of DVD.
Figure 10:
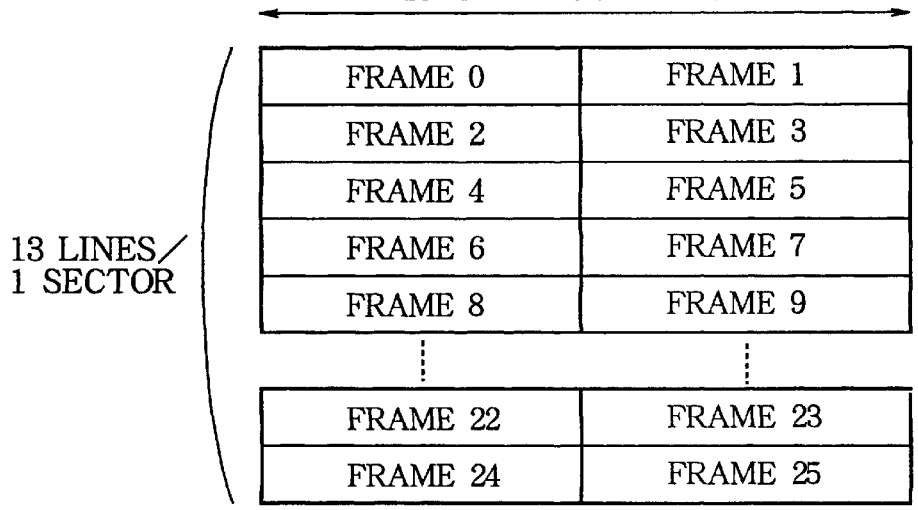
FIG. 10 is a view showing a sector data structure of DVD.
Figure 11:
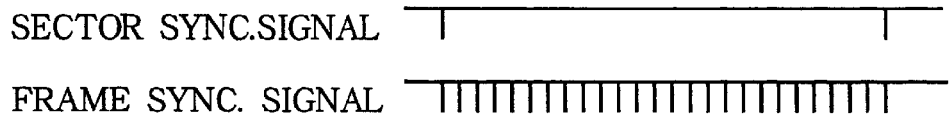
FIG. 11 is a view showing relationship between a sector synchronization signal and a frame synchronization signal in DVD.
Figure 12:
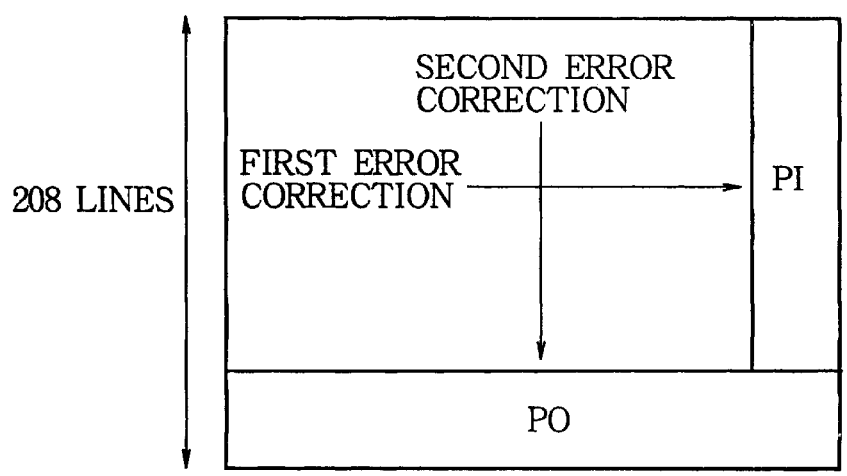
FIG. 12 is a view showing a structure of an error correction block (a product code) in DVD.

As shown in FIG. 8, the counter 12 counts the uncorrectable code detection signals output from the error corrector 1, only when the count value of the counter 9 output from the count value reading device 11 is larger than a predetermined value ("7" in this example). For example, the 182-byte code 0 includes 6 pieces of 1-byte data that cannot be demodulated, and therefore, even when the uncorrectable code detection signal on the code 0 is input, the counter 12 does not count it. On the other hand, all of 182 pieces of 1-byte data included in the code 1 cannot be demodulated, and accordingly the count value of the counter 9 becomes 182. Consequently, the counter 12 counts the uncorrectable code detection signal on the code 1. The count value of the counter 12 is delivered to the comparator 4 in synchronization with the block synchronization signal by the synchronizer 7. The comparator 4 compares the count value of the counter 12 with a predetermined value, and, when the count value reaches this predetermined value, outputs a comparison result signal indicative of it to the determination device 5. The determination device 5 outputs the uncorrectable block detection signal to the controller 113 in response to this comparison result signal.

It is known empirically that the possibility of succeeding in correcting a code is high if the number of pieces of data (1-byte data, for example) that cannot be demodulated included in this code is less than a predetermined value (7, for example). Accordingly, with the third example, it is possible to minimize the chance of uselessly carrying out rereading of data from the disk.

Although the above-described apparatuses of the first to the third examples have the error detector 110 for detecting errors by use of EDCs, it is dispensable.

The above explained preferred embodiments are exemplary of the invention of the present application which is described solely by the claims appended below. It should be understood that modifications of the preferred embodiments may be made as would occur to one of skill in the art.

What is claimed is:

1. An information reproduction apparatus comprising:
   an error corrector which performs a first error correction for correcting errors in a horizontal direction within an input data block comprised of a product code and subsequently a second error correction for correcting errors in a vertical direction within said input data block, said error corrector producing a first signal each time an uncorrectable code word is detected while said first error correction is being performed;
   a first counter for counting said first signal;
   a comparator for comparing a count value of said first counter with a predetermined value and producing a second signal when said count value reaches said predetermined value;
   a determination device determining that there is an error within said input data block which said error corrector cannot correct, and delivering a third signal in response to said second signal; and
   a controller for controlling a data reading device to re-read said input data block in response to said third signal so that said controller initiates re-reading of said input data block before said error corrector performs said second error correction.

2. An information reproduction apparatus according to claim 1, further including a synchronization signal producing device for producing, from input data constituting an input data block, a synchronization signal used for synchronizing elements within said information reproduction apparatus.

3. An information reproduction apparatus according to claim 1, further comprising said data reading device for reading data to be reproduced, said data reading device performing rereading of said input data block in response to said third signal.

4. An information reproduction apparatus according to claim 1, further comprising:
   a sector error detector for detecting errors on a sector-by-sector basis subsequent to said first and second error correction.

5. An information reproduction apparatus including an error corrector which performs a first error correction for correcting errors in a horizontal direction within an input data block comprised of a product code and subsequently a second error correction for correcting errors in a vertical direction within said input data block, said error corrector producing a first signal each time an uncorrectable code word is detected while said first error correction is being performed;

said information reproduction apparatus further including:

a first counter for counting said first signal;

a comparator for comparing a count value of said first counter with a predetermined value and producing a second signal when said count value reaches said predetermined value; and a determination device determining that there is an error within said input data block which said error corrector cannot correct, and delivering a third signal to the outside in response to said second signal;

a synchronization signal producing device for producing, from input data constituting an input data block, a synchronization signal used for synchronizing elements within said information reproduction apparatus; and a synchronizer for delivering said count value of said first counter to said comparator in synchronization with said synchronization signal.

6. An information reproduction apparatus including an error corrector which performs a first error correction for correcting errors in a horizontal direction within an input data block comprised of a product code and subsequently a second error correction for correcting errors in a vertical direction within said input data block, said error corrector producing a first signal each time an uncorrectable code word is detected while said first error correction is being performed;

said information reproduction apparatus further including:

a first counter for counting said first signal;

a comparator for comparing a count value of said first counter with a predetermined value and producing a second signal when said count value reaches said predetermined value;

a determination device determining that there is an error within said input data block which said error corrector cannot correct, and delivering a third signal to the outside in response to said second signal;

a demodulator for demodulating input data with reference to a table in which a plurality of pieces of data are registered and outputting demodulated data as a part of a code word;

a device for producing a fourth signal when said input data does not match any of said plurality of pieces of data registered in said table;

a second counter for counting said fourth signal; and a reading device for reading a count value of said second counter and outputting a signal responsive to said count value read from said second counter to said first counter;

said first counter counting said first signal only for code words count values on which output from said reading device exceed a predetermined value.

7. An information reproducing method comprising:

executing an error correction function, said error correction function including a first error correction to correct errors in a horizontal direction within an input data block comprised of a product code and a second error correction for correcting errors in a vertical direction within said input data block, said error correction producing a first signal each time an uncorrectable code word is detected while said first error correction is being performed;

counting said first signal;

comparing a count value of said first signal with a predetermined value and producing a second signal when said count value reaches said predetermined value;

determining that there is an error within said input data block which said error correction cannot correct, and delivering a third signal in response to said second signal; and controlling a data reading device to re-read said input data block in response to said third signal so as to initiate re-reading of said input data block before said error correction performs said second error correction.

8. An information reproducing method according to claim 7, further comprising:

reading data to be reproduced, said data reading step being executed to reread said input data block in response to said third signal.

9. An information reproducing method according to claim 7, further comprising:

detecting errors on a sector-by-sector basis subsequent to said first and second error correction.

10. An information reproducing method according to claim 7, further including producing, from input data constituting an input data block, a synchronization signal used for synchronizing elements within an information reproduction apparatus that executes said information reproducing method.

11. An information reproducing method including an error correction function, which performs a first error correction for correcting errors in a horizontal direction within an input data block comprised of a product code and subsequently a second error correction for correcting errors in a vertical direction within said input data block, said error correction producing a first signal each time an uncorrectable code word is detected while said first error correction is being performed;

said information reproducing method further including:

counting said first signal;

comparing a count value of said first signal with a predetermined value and producing a second signal when said count value reaches said predetermined value; and determining that there is an error within said input data block which said error correction cannot correct, and delivering a third signal to the outside in response to said second signal;

producing, from input data constituting an input data block, a synchronization signal used for synchronizing elements within an information reproduction apparatus that performs said information reproducing method; and delivering said count value of said counting to an element that performs said comparing in synchronization with said synchronization signal.

12. An information reproducing method that includes an error correction function which performs a first error correction for correcting errors in a horizontal direction within an input data block comprised of a product code and subsequently a second error correction for correcting errors in a vertical direction within said input data block, said error correction producing a first signal each time an uncorrectable code word is detected while said first error correction is being performed;

said information reproducing method further including:
    counting said first signal;
        comparing a count value of said first signal with a predetermined value and producing a second signal when said count value reaches said predetermined value;
        determining that there is an error within said input data block which said error correction cannot correct, and delivering a third signal to the outside in response to said second signal;

demodulating input data with reference to a table in which a plurality of pieces of data are registered and outputting demodulated data as a part of a code word;

producing a fourth signal when said input data does not match any of said plurality of pieces of data registered in said table;

counting said fourth signal; and reading a count value of said fourth signal and outputting a signal responsive to said count value to control said step of counting said first signal;

said step of counting said first signal counting said first signal only for code words count values on which output from said reading step exceed a predetermined value.

\* \* \* \* \*